United States Patent Office 3,222,374
Patented Dec. 7, 1965

3,222,374
PROCESS FOR PREPARING 5-CYANO-4-LOWER ALKYL OXAZOLE
George Oswald Chase, Hawthorne, N.J., assignor to Hoffmann-La Roche Inc., Nutley, N.J., a corporation of New Jersey
No Drawing. Filed Nov. 20, 1964, Ser. No. 412,851
8 Claims. (Cl. 260—307)

This application is a continuation-in-part of application Serial No. 282,233, filed May 22, 1963, in the name of George Oswald Chase, and now abandoned.

The present invention relates to a new and improved process. More particularly, the present invention relates to a new and improved process for the preparation of 5-cyano-4-lower alkyloxazoles, preferably, 5-cyano-4-methyloxazoles, which oxazoles are useful intermediates in the preparation of vitamin $B_6$ (pyridoxol hydrochloride).

Heretofore, 5-cyano-4-lower alkyl oxazoles have been prepared by reacting phosphorous pentoxide heated to melt with 5-carboxamide-4-lower alkyloxazoles. Inherent in this procedure is the problem caused by severe yield loss due to charring resulting from poor heat transfer. Furthermore, due to the formation of a glassy substance during the reaction, the reaction mass develops a high viscosity which makes the stirring thereof difficult, if not impossible. Thus, unless extreme and time consuming care is taken, the mechanism employed during the stirring step fails to function properly and is subject to mechanical breakdowns. These difficulties result in an appreciable expense due to the cost of restoring such mechanisms to their original state and/or in a significant loss of time either when exercising the extreme caution necessary to avoid mechanical breakdowns or, alternatively, when awaiting the restoration of a stirring mechanism which has failed under the strain of such a high viscosity to a good operating condition.

Additionally, the prior art indicates that dehydrating agents containing halogen, e.g. phosphorus oxyhalides and the like, are conventionally utilized in the conversion of amides to nitriles. Inherent in such use is the formation of hydrohalic acids and the attendant corrosion problems associated with their presence. Furthermore, if the last-mentioned agents were to be used in the process of the present invention, the propensity of the so-formed acid halide to add across either of the double bonds of the oxazole nucleus would result in unwanted side products, requiring time consuming separating procedures. Thus, such type dehydrating agents are unsuited for the purposes of the present invention.

It is, therefore, an object of the present invention to provide a simple and facile method for the preparation of 5-cyano-4-lower alkyloxazoles, which preparation readily proceeds under normal operating conditions, which does not result in the reaction mass developing a high viscosity, which does not suffer from corrosion problems and which is successfully completed in a short period of time giving the desired 5-cyano-4-lower alkyloxazoles in high yields and of a good quality.

It is a further object of the present invention to provide a simple and facile method for the preparation of 5-cyano-4-lower alkyloxazoles which is low in cost and which assures the efficacious utilization of the starting materials employed.

In achieving these objectives within the purview of the present invention, it has been found that when 5-carboxamide-4-lower alkyloxazoles are heated with phosphorous pentoxide in the presence of solvent amounts of a member selected from the group consisting of dilower alkyl aniline, advantageously, dimethyl aniline and quinoline, a simple, facile and highly efficient procedure for the preparation of 5-cyano-4-lower alkyloxazoles is devised.

Thus, the invention relates to a method of preparing a 5-cyano-4-lower alkyloxazole by means of the reaction of a 5-carboxamide-4-lower alkyloxazole with phosphorrous pentoxide, the improvement residing in the performance of the reaction in the presence of solvent amounts of a member selected from the group consisting of dilower alkyl aniline and quinoline. By proceeding accordingly, it is assured that high quality 5-cyano-4-lower alkyloxazole is prepared in good yields and in the absence of special operating conditions or precautions.

In an advantageous process aspect, the 5-carboxamide-4-lower alkyloxazole and the quinoline or the dilower alkyl aniline such as the preferred dimethylaniline are first combined and the phosphorus pentoxide is added to the resultant combination. The dehydration of the 5-carboxamide-4-lower alkyloxazole then proceeds to the formation of 5-cyano-4-lower alkyloxazole. This technique is particularly advantageous among other things as it permits the utilization of the starting amide in an unpurified form. Known techniques for the preparation of 5-carboxamide-4-lower alkyloxazole gives a crude which contains this product and water. In the process of the present invention, it should be obvious that the presence of water in the starting materials would upset the equilibrium of the ensuing reaction thereby rendering the technique less efficient. By combining the crude amide and quinoline and heating the combination before the addition of the dehydrating agent, the unwanted water is removed azeotropically. Thus, the amide-containing crude can be utilized without drying the same thereby providing a valuable attribute to this aspect of the invention from a commercial point of view.

Temperature is not a critical factor in the performance of the process. All that is required is that the temperature employed be maintained below the temperature necessary to cause any of the reactants to vaporize. With this limitation in view, a temperature range betwen 80° C. and 190° C. is preferred.

This preparation of the desired 5-cyano-4-lower alkyloxazole provides an effective yet practical solution to the problems inherent in prior art synthesis. When the reaction is effected in the presence of a member selected from the group consisting of dilower alkyl aniline and quinoline, no significant change in viscosity occurs during the course of the reaction. Furthermore, quinoline and dilower alkyl aniline are materials readily available at low cost and, due to the differential in boiling points between quinoline and the cyano oxazoles or the dimethylaniline and the cyano oxazole, they are readily recoverable for reuse in the preparation of other batches of high quality cyano oxazoles. Thus, in a simple yet highly effective manner with a minimal of waste of the starting materials involved, the objects included within the purview of the present invention are efficaciously achieved. While both quinoline and dilower alkyl anilines function efficaciously for the purposes of the present invention, quinoline is preferred since it provides for relatively greater efficiency when separating the oxazole.

The term "lower alkyl" as used throughout the instant specification is intended to connote a straight or branched chain hydrocarbon group containing 1 to 7 carbon atoms such as methyl, ethyl, isopropyl, butyl and the like.

The following examples are illustrative but not limitative of the present invention. All temperatures are in degrees centigrade unless otherwise stated.

*Example 1*

In a 2-liter, 3-necked flask equipped with stirrer, thermometer, a condenser and receiver, is placed 126 g. of 5-carboxamide-4-methyloxazole. To this is added 475 ml. of quinoline which may be either fresh or recovered material. The mixture is heated with stirring at 180°.

When the internal temperature had reached 170°, all the amide had dissolved. 156 g. of phosphorous pentoxide is then slowly added over a period of 10 minutes. After stirring for 15 minutes, a vacuum is applied to aspirate a mixture of the desired product and quinoline into the receiver at a controlled rate. The vacuum is maintained at 20 to 30 mm. until no further distillate is obtained. The crude cyano oxazole is next fractionated through a short column using a reflux ratio of 1:1, the product boiling at 60–62° C. at 20 mm. is collected, said product being 5-cyano-4-methyloxazole.

The quinoline is recovered as follows:

To the reaction mixture is added 275 ml. of water. The resultant mixture is stirred on a steam bath and thereafter neutralized with 50 percent caustic soda solution whereby to form a 2 phase system. The lower layer is separated and distilled at atmosphere pressure. The distillate became clear thereby indicating that no further quinoline was present therein. The upper layer is placed in a still with a 15 inch column. Water is removed under reduced pressure. All the material boiling in the range of 163 to 166°/100 mm. is collected. The residue is discarded. When the above distillates are combined with the distilled residue from the fractionation, a substantial amount of all the quinoline originally employed is recovered.

*Example 2*

The below mentioned process for the preparation of vitamin $B_6$ and the intermediates resulting therefrom are not part of the present invention but such are disclosed hereinbelow in order that this disclosure may be complete.

A mixture of 300 g. cis-2-butene-1,4-diol, 3.0 l. of acetone, 200 g. of anhydrous sodium sulfate and 13 ml. of concentrated sulfuric acid was stirred for 21 hours. The acid was neutralized by the addition of 500 g. lead carbonate with stirring over a period of 20 hours. The inorganic salts were filtered off and the filtrate stirred with 125 g. of anhydrous potassium carbonate for 1½ hours. The filtered solution was concentrated at atmospheric pressure and the residue distilled in vacuo. The fraction boiling at 45–51.5°/20.5–22 mm. Hg was collected and fractionated at atmospheric pressure to give 4,7 - dihydro-2,2 - dimethyl-1,3 - dioxepin as a colorless liquid, B.P. 144.5–147°/755 mm. Hg, $n_D^{24.5}$=1,4465.

*Example 3*

3 ml. of 4-methyl-5-oxazolecarbonitrile and 23.1 g. of 4,7-dihydro-2,2-dimethyl-1,3-dioxepin were combined and heated in a sealed tube at 180° for 34 hours. The reaction mixture was cooled and taken to complete dryness at high vacuum. The residue was extracted with 800 ml. of ether and insoluble material was filtered off and discarded. The filtrate was treated with charcoal and magnesium sulfate, filtered and evaporated in vacuo to dryness by means of a rotary evaporator. No attempt was made to crystallize the product (1,5-dihydro-3,3,8 - trimethylpyrido - [3,4 - e][1,3]dioxepin - 9 - ol). Treatment with ethanolic hydrogen chloride afforded directly, crystalline crude pyridoxol hydrochloride, M.P. 202–202.5° (dec.), which proved to be identical in all respects with an authentic specimen of pyridoxol hydrochloride after one recrystallization from absolute ethanol.

*Example 4*

In a 2-liter, 3-necked flask equipped with a stirrer, thermometer, Claisen still head, a condenser and receiver is placed 10 moles of 5-carboxamide-4-methyloxazole. To this is added a total of 2375 ml. of quinoline. The amide is suspended by stirring, and 1560 g. of phosphorous pentoxide is carefully added to the stirred mixture. The flask containing the three ingredients is heated. Heat is applied until the internal temperature reaches 140°. Gentle vacuum is applied to aspirate a mixture of the desired product and quinoline into the receiver at a controlled rate. The vacuum is slowly built up to a maximum of 40 mm. of mercury and the distillation is interrupted when no further material distills at a vapor temperature of 130°, with the internal temperature held at 140°. The operation is normally complete in one hour.

The crude cyano-oxazole is next fractionated through a short column using a reflux ratio of 1:1. The product, boiling at 60–62° at 20 mm., is collected, said product being 4-methyl-5-oxazolecarbonitrile.

The quinoline is recovered as follows:

The reaction mixture is stirred and permitted to cool at 110° C. At this point, 2750 ml. of tap water are added with stirring. The condenser is shifted to the reflux position and the mixture is neutralized by the careful addition of 1300 ml. of 50 percent caustic soda solution. The aqueous phase is separated and the dark upper layer is placed in a still equipped with a 10 inch packed column. The water present in the crude quinoline is distilled off under a vacuum of 100 mm. of mercuury. All the material boiling in the range of 163° to 166° per 100 mm. is collected. The residue is discarded. When the above distillate is added to the distilled residue from the fractionation, a substantial amount of all the quinoline originally employed is recovered.

*Example 5*

Into a 2 liter, 3-neck flask equipped with a stirrer, heating mantel, thermometer, Claisen still-head, condenser and receiver cooled in an ice-alcohol bath, there was sequentially added 126.1 grams of 5-carboxamide-4-methyloxazole and 473 mls. of dimethylaniline. The resultant mixture was stirred and 141.6 grams of phosphorous pentoxide was added thereto all at once. The slurry was heated to 80°. The heating mantle was removed and the exothermal reaction was permitted to proceed without external cooling. As soon as the internal temperature started to drop, the heating mantle was replaced. A crude containing 5-cyano-4-methyloxazole and the solvent was stripped by heating to an internal temperature of 130° under a vacuum of 20 mm. of mercury. The crude is next fractionated through a short column using a reflux ratio of 1:1, the product boiling at 60–62° at 20 mm. is collected, said product being 5-cyano-4-methyloxazole.

*Example 6*

In a 2-liter, 3-necked flask equipped with stirrer, thermometer, a condenser and receiver is placed crude moist 5-carboxamide-4-methyloxazole equivalent to 126 g. of dry material. To this is added 575 ml. of quinoline which may be either fresh or recovered material. The mixture is heated with stirring at 180° under vacuum. When the internal temperature has reached 140° at 40 mm., the water present in the crude amide was removed by azeotropic distillation. The batch is now cooled to 55° with stirring and 156 g. of phosphorous pentoxide is then added all at once. The batch is gradually heated to 130° and after stirring for 15 minutes, a vacuum is applied to aspirate a mixture of the desired product and quinoline into the receiver at a controlled rate. The vacuum is maintained at 30 to 40 mm. until no further distillate is obtained. The crude cyano oxazole is next fractionated through a short column using a reflux of 1:1, the product boiling at 60–62° at 20 mm. is collected, said product being 5-cyano-4-methyloxazole.

I claim:

1. In a process for the preparation of 5-cyano-4-lower alkyloxazole by means of the reaction of 5-carboxamide-4-lower alkyloxazole with phosphorus pentoxide, the improvement comprising performing the reaction utilizing a solvent medium containing a member selected from the group consisting of quinoline and dilower alkyl aniline.

2. In a process for the preparation of 5-cyano-4-lower alkyloxazole by means of the reaction of 5-carboxamide-4-lower oxazole with phosphorus pentoxide, the improvement comprising performing the reaction utilizing a solvent medium comprising dilower alkyl aniline.

3. A process as in claim 2 wherein the dilower alkylaniline utilized is dimethylaniline.

4. A process for the preparation of 5-cyano-4-lower alkyloxazole which comprises combining 5-carboxamide-4-lower alkyloxazole and solvent amounts of dilower alkyl aniline and adding phorphorus pentoxide to the resultant combination.

5. In a process for the preparation of 5-cyano-4-lower alkyloxazole by means of the reaction of 5-carboxamide-4-lower alkyloxazole with phosphorous pentoxide, the improvement comprising performing the reaction utilizing a solvent medium comprising quinoline.

6. A process for the preparation of 5-cyano-4-methyloxazole which comprises reacting phosphorous pentoxide with 5-carboxamide-4-methyloxazole utilizing a solvent medium comprising quinoline.

7. A process for the preparation of 5-cyano-4-lower alkyloxazole which comprises combining 5-carboxamide-4-lower alkyloxazole and a solvent medium comprising quinoline and adding phosphorous pentoxide to the resulting combination.

8. A process for the preparation of 5-cyano-4-methyloxazole which comprises combining 5-carboxamide-4-methyloxazole with a solvent medium comprising quinoline and adding phosphorous pentoxide to the resulting combination.

References Cited by the Examiner
UNITED STATES PATENTS 2,387,435   10/1945   Fleysher _____ 260—465

OTHER REFERENCES

MacArdle, The Use of Solvents in Synthetic Organic Chemistry. (New York, 1925), pages 1–3 and 8–11.

Wagner et al., Synthetic Organic Chemistry (New York, 1953), pages 596–598.

NICHOLAS S. RIZZO, *Primary Examiner.*